(12) United States Patent
De Vaan

(10) Patent No.: US 7,755,827 B2
(45) Date of Patent: Jul. 13, 2010

(54) DISPLAY SYSTEM WITH VARIABLE DIFFUSER

(75) Inventor: Adrianus Johannes Stephanus Maria De Vaan, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 200 days.

(21) Appl. No.: 12/096,808

(22) PCT Filed: Dec. 5, 2006

(86) PCT No.: PCT/IB2006/054592

§ 371 (c)(1), (2), (4) Date: Jun. 10, 2008

(87) PCT Pub. No.: WO2007/069125

PCT Pub. Date: Jun. 21, 2007

(65) Prior Publication Data

US 2008/0278791 A1 Nov. 13, 2008

(30) Foreign Application Priority Data

Dec. 15, 2005 (EP) ................... 05112208

(51) Int. Cl.
- G02F 1/03 (2006.01)
- G02B 5/02 (2006.01)
- F21V 9/00 (2006.01)

(52) U.S. Cl. .............. 359/245; 359/443; 359/599; 362/509; 362/511; 362/609; 349/64; 349/65; 349/112

(58) Field of Classification Search ............... 359/245, 359/443, 599; 362/30, 31, 231, 341, 609, 362/615, 618, 620; 345/102, 170, 173, 184, 345/207; 353/7, 13, 30, 84, 94, 99, 122; 349/5, 16, 62, 64, 65, 112, 113, 122, 176; 348/88, 823, 824; 313/478

See application file for complete search history.

(56) References Cited

U.S. PATENT DOCUMENTS

| | | | | |
|---|---|---|---|---|
| 3,491,245 A | * | 1/1970 | Hardesty | 250/227.11 |
| 5,225,818 A | * | 7/1993 | Lee et al. | 345/170 |
| 5,349,379 A | * | 9/1994 | Eichenlaub | 348/59 |
| 5,790,186 A | * | 8/1998 | Tenny et al. | 348/88 |
| 5,831,698 A | | 11/1998 | Depp et al. | |
| 6,157,424 A | * | 12/2000 | Eichenlaub | 349/74 |
| 2003/0133284 A1 | | 7/2003 | Chipchase et al. | |
| 2005/0185278 A1 | | 8/2005 | Horsten et al. | |
| 2007/0069974 A1 | * | 3/2007 | Kawata et al. | 345/1.1 |
| 2008/0007645 A1 | * | 1/2008 | McCutchen | 348/360 |

FOREIGN PATENT DOCUMENTS

| | | |
|---|---|---|
| EP | 0829744 A2 | 3/1998 |
| EP | 0918247 A2 | 5/1999 |
| WO | WO0146722 A1 | 6/2001 |
| WO | WO02084695 A2 | 10/2002 |
| WO | WO03010593 A1 | 2/2003 |
| WO | WO2005045793 A1 | 5/2005 |

\* cited by examiner

Primary Examiner—Loha Ben

(57) ABSTRACT

A display system comprises a display device (DD) with a display screen (DS) for displaying an image. A diffuser (DI) is arranged in front of the display device (DD). A controller (CO) controls at least a portion of the diffuser (DI) to be in a transparent state wherein the display screen (DS) is visible or in an opaque state for hiding the display screen (DS). The controller (CO) also controls an illumination system (IS) to illuminate at least the portion of the diffuser (DI) when in the opaque state.

16 Claims, 1 Drawing Sheet

DISPLAY SYSTEM WITH VARIABLE DIFFUSER

FIELD OF THE INVENTION

The invention relates to a display system comprising a diffuser in front of a display device, a diffuser system, and a method of controlling in a display system.

BACKGROUND OF THE INVENTION

When a display apparatus is switched to its off-state, a display screen of a display device of the display apparatus has an appearance which is not in harmony with its surrounding. Usually, the display screen is rather black when no image is displayed.

WO 02/084695 discloses a picture display device, which has an active part (the display screen) on which pictures are displayed. An LC shutter of a size corresponding to the size of the active part of the display device is fixed to the surface of the display device in front of the display device. The LC shutter is energized in accordance with the on/off operation of the display device. The LC shutter comprises an LC cell with an LC gel, which can be switched between a light-transmissive state and an opaque, particularly scattering, state. The LC shutter is transparent when the display device is in the on-state and is opaque in the off-state. In the opaque state of the LC shutter, the display screen is hidden for an observer and thus is less disturbing in its surroundings.

However, a problem with the LC shutter is that its hiding effect is limited. If the LC shutter provides a good hiding effect, the shutter appears to be either a little diffuse in its transmissive state during the on-state of the display apparatus, or another layer needs to be provided which simultaneously increases the ambient light reflection but reduces the daylight contrast.

SUMMARY OF THE INVENTION

It is an object of the invention to provide a display system with an improved compromise between the hiding effect and the diffuseness.

A first aspect of the invention provides a display system as claimed in claim 1. A second aspect of the invention provides a diffuser system as claimed in claim 14. A third aspect of the invention provides a method of controlling as claimed in claim 16. Advantageous embodiments are defined in the dependent claims.

A display system in accordance with the first aspect of the invention comprises a display device with a display screen for displaying an image thereon. An image may be a photo, a film, a broadcast event, a text, a synthetic image as, for example, generated by a computer, or any other graphical information or a combination of graphical information in one picture. The image may comprise moving information. The diffuser is arranged in front of the display screen such that an observer sees the image displayed on the display screen through the diffuser. The display system further comprises an illumination system, which is able to illuminate the diffuser. A controller controls the diffuser to be either in a transparent state wherein the display screen is visible or in an opaque, usually scattering, state wherein the display screen is hidden for the observer. The controller controls the illumination system to illuminate the diffuser when in the opaque state. Consequently, the diffuser illuminates light to the surroundings of the display system when the diffuser is in the opaque state. The opaque state may be used to hide the image when displayed, or to hide the display screen when the display device is in its off-state. Due to the light of the illumination system illuminating the diffuser, the hiding effect of the diffuser is increased. Thus, if a same diffuser is used, the hiding effect is increased while the diffuseness of the diffuser is not changed. Consequently, the sharpness of the image when the diffuser is in its transparent state is not altered. Alternatively, the same hiding effect is possible with a diffuser, which is less diffuse. Such a less diffuse diffuser is also less diffuse if in its transparent state thereby improving the contrast ratio and the perceived sharpness of the image displayed by the display device. In both applications, an improved compromise between the hiding effect of the display screen in the opaque state of the diffuser and the diffuseness of the image in the transparent state of the diffuser is obtained. The addition of the illumination system may also be used to select a diffuser, which is somewhat less diffuse such that both the hiding effect and the sharpness of the image are increased.

A diffuser system in accordance with the second aspect comprises a diffuser, which has a transparent state and an opaque state. The diffuser system further comprises an illumination system for illuminating the diffuser when in the opaque state. The illumination system comprises a light source, which is arranged along at least one of the edges of the diffuser, and a light guide which guides the light emitted by the light source towards the diffuser. Again, the illumination improves the hiding effect of the diffuser when in its opaque state. Or, if a diffuser is selected with a lower diffuseness: the hiding effect during the opaque state may be the same or somewhat improved while at the same time the diffuseness is decreased during the transparent state.

It has to be noted that the complete diffuser may be either in the transparent state or in the opaque state. Alternatively, the diffuser may be divided in separately controllable portions, which are controlled separately. This has the advantage that it is possible to produce an overlaying image on the image displayed by the display device by selectively controlling the diffuser portions. For example, a clock can be displayed which overlays the image by keeping the diffuser portions which form the clock display in the opaque state while the rest of the diffuser is in the transparent state. Alternatively, the portions, which form the clock, may be transparent while the rest of the image is invisible (or less visible) by controlling the associated portions of the diffuser to be opaque. It is also possible to use a diffuser which is larger than the screen area of the display device. For example, the area of the diffuser not covering the display device could be in diffuse state when the rest of the diffuser is transparent to created a line of light around the display screen. the portion of the diffuser not covering the screen area of the display device may be divided in separately controllable portions to create an additional display image area outside the display area of the display device. This additional display image area may, for example, display a clock or any other information.

In an embodiment as claimed in claim 2, the controller switches the illumination system to a relatively high light level during the opaque state and to a relatively low level during the transparent state. The relatively high brightness during the opaque state causes a good hiding of either the image when displayed or of the display screen if no image is displayed, while the relatively low brightness during the transparent state does not deter the image displayed on the display screen.

In an embodiment as claimed in claim 3, the display device has an off-state wherein no image is displayed, and an on-state wherein the image is displayed. The controller controls the diffuser to obtaining the opaque state during the off-state and the transparent state during the on-state. Further, the controller controls the illumination system to emit light having a higher brightness during the off-state than during the on-state.

If the diffuser is made of high quality such that the light in the diffuser does not deteriorate the image quality to a too high extent, the light can remain on while watching the image. Thus, it is possible to only dim the light when the image should be visible. It is not required to switch the light completely off.

In an embodiment as claimed in claim 4, the controller activates the illumination system during the opaque state and switches off the illumination system during the transparent state. Thus, the illumination system does not illuminate the diffuser during the transparent state to minimally disturb the image.

In an embodiment as claimed in claim 5, the diffuser comprises separately controllable portions. If the switcheable diffusers are provided in a pattern, it is possible to display an additional image next to or overlaying the image displayed on the display screen. For example, it is possible to create a small lighting stripe around the image, or a clock just next to (or overlaying) the image displayed on the display screen.

In an embodiment as claimed in claim 6, the illumination system illuminates the side of the diffuser, which is directed towards the display device. Thus, the light emitted by the light source cannot reach the observer directly but only via the diffuser which is in the opaque state. Consequently, the light emitted does not dazzle the observer.

In an embodiment as claimed in claim 7, the illumination system comprises a light source along at least one of its edges. Preferably, light sources are present at least two of the edges to obtain a uniform illumination of the diffuser. It is however not essential that the diffuser is uniformly illuminated. An observer might find it pleasant to have a predetermined gradient of illumination over the diffuser.

In an embodiment as claimed in claim 8, the light source comprises at least one but preferably a row of light emitting devices, such as, for example light emitting diodes. Alternatively, the light sources may be lasers.

In an embodiment as claimed in claim 10, the illumination system comprises a light guide for guiding light emitted by the light source towards the diffuser. Such a light guide provides the possibility to obtain a predetermined illumination pattern on the diffuser. Preferably, the light guide is used to obtain a uniform illumination across the diffuser.

In an embodiment as claimed in claim 11, at least at the side(s) at which the light enters the light guide, this side is made reflective with the exception of at least one hole where the light can enter the light guide. This improves the operation of the system because less light can leave this side of the light guide. Preferably all sides of the light guide are made reflective.

In an embodiment as claimed in claim 12, an area of the diffuser corresponds to an area of the display device on which the image is displayed. The diffuser has optimal dimensions if it completely covers the area of the display device on which the image is displayed but not more, such that the complete image is visible to an observer if the diffuser is in its transparent state, while the dimensions of the diffuser are minimal.

In an embodiment as claimed in claim 13, the area of the diffuser corresponds to an area of the display device, and the light guide is constructed to illuminate substantially the total area of the diffuser. Now, the complete image is visible in the transparent state of the diffuser, and the complete display screen is hidden from the observer during the opaque state of the diffuser.

These and other aspects of the invention are apparent from and will be elucidated with reference to the embodiments described hereinafter.

It should be noted that items, which have the same reference numbers in different Figures, have the same structural features and the same functions, or are the same signals. Where the function and/or structure of such an item has been explained, there is no necessity for repeated explanation thereof in the detailed description.

DETAILED DESCRIPTION

Figure 1:
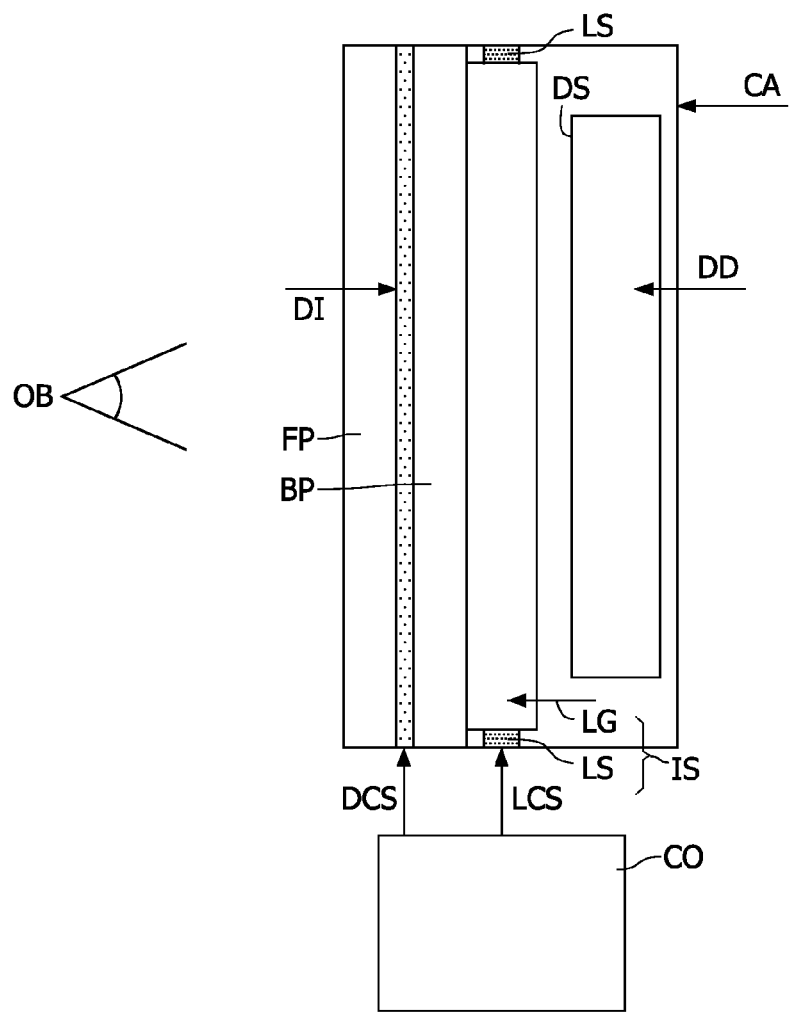
FIG. 1 shows an embodiment of the display system in accordance with the invention.

FIG. 1 shows an embodiment of the display system in accordance with the invention. The display system comprises a cabinet CA which holds the display device DD, an illumination system IS, and a switcheable diffuser DI sandwiched between two transparent plates FP and BP. The illumination system IS comprises an optional light guide LG, and at least one light source LS. The cabinet is open at the side where the diffuser DI is present to enable an observer OB to view an image displayed on a display screen DS of the display device DD when the diffuser DI is transparent. The display system further comprises a controller CO which supplies the control signal DCS to the diffuser DI and the control signal LCS to the light sources LS.

In the embodiment shown in FIG. 1, the display system has a first state wherein the controller CO controls the diffuser DI to be transparent and the display screen DS of the display device DD is visible to the observer OB. The display system has a second state wherein the controller CO controls the diffuser DI to be opaque and the display screen DS of the display device DD is hidden for the observer OB. During the second state, the controller controls the light source LS to emit light to illuminate the diffuser DI at the side showing away from the observer OB. This light increases the hiding effect of the diffuser.

The controller CO is constructed to control the state of the diffuser DI and the illumination system IS with the control signals DCS and LCS, respectively. Preferably these states are synchronized, the illumination system IS has a higher brightness during the period in time the diffuser DI is in its opaque state, than during the period in time the diffuser DI is in its transmissive state. Preferably, the illumination system IS does not illuminate the diffuser DI during the period in time the diffuser is transparent, especially if an image is displayed on the display screen DS.

The controller CO may be constructed to receive an input signal (not shown) which indicates whether the display system is in its on-state wherein an image is displayed on the display screen DS or in its off-state wherein no image is displayed. Now, during the on-state of the display system, the controller CO supplies the control signal DCS to obtain a transparent diffuser DI and the control signal LCS to control the illumination system IS to not produce light. And, during the off-state of the display system, the controller CO supplied the control signal DCS to obtain an opaque diffuser DI and the control signal LCS to control the illumination system to illuminate the diffuser DI.

There are many possibilities to design a suitable lightguide for this application. A very suitable embodiment for the lightguide is a thin transparent plate (for example, having a thickness of 4 mm). The light (for example originating from a number of LED's) is fed into this waveguide from the sides with such an optical subsystem that the light is traversing into the waveguide with such an angular distribution that Total Internal Reflections (TIR) traps the light into the waveguide. To obtain a high efficiency and compact in-coupling optics between the LED's and the lightguide, this lightguide is favorably made of a material having a high refractive index. Preferably, the switcheable diffuser is glued to the waveguide, such that the light rays within the waveguide can enter the carrying plate BP from the switcheable diffuser and reach the diffusing layer DI. When the light rays hit the diffuser, the light rays are diffused and light can leave the system towards the viewer. Some of the light however will be bounced back into the waveguide due to the Total Internal Reflection at the interface between the switcheable diffuser carrying plate FP and the air at the viewer side. Since light is leaving from the system at the viewer side, it is favorable to generate such a light field for the light rays entering the light guide from the LED's that the angular distribution is somewhat focused towards the back surface of the light guide (this is the surface at the side of the Display Device DD).

The most optimum situation can be found by using an optical ray trace program and can be performed by a skilled optical engineer that is capable to work with such a program.

In case the Display Device is an LCD display, and using the fact that the light leaving an LCD panel is linearly polarized enables a further system optimization. It is possible to include light-reflecting elements in the waveguide that transmit the polarized light from the LCD panel, while they reflect the light from the light source having the opposite polarization.

The optical efficiency of the system will be further improved when the four thin sides of the diffuser are coated with a reflector. Now, there are holes left open in these reflectors to allow the light originating from the light sources to enter the waveguide, while at those parts of the sides that are now coated with a reflective coating, the light bounces back into the waveguide. This reflected light would be lost without this reflective layer.

The light field that will result to best homogeneity for the illumination of the diffuser will be a light field of almost parallel rays that enter the light guide. This situation is approximated best when the light emitting area of the light sources is small with respect to the entrance area of the waveguide. Within a given situation, it means that the homogeneity can be improved when the waveguide is made thicker (or in an optical equivalent it is made of a higher refractive index material) or the used light sources are of a smaller type (preferably lasers).

In the embodiment shown in FIG. 1, the display device DD is a flat display, such as for example a LCD, or plasma display. Preferably, the display device DD is a matrix display. The light guide LG and the back plate BP may be the same element.

Figure 2:
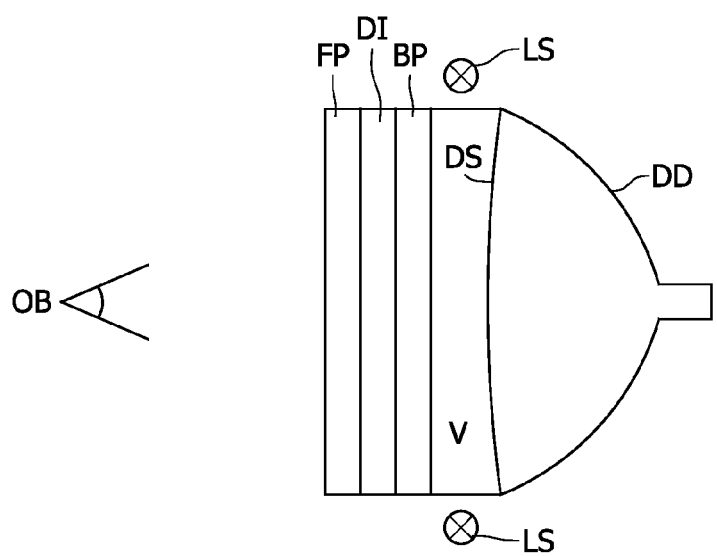
FIG. 2 shows another embodiment of the display system in accordance with the invention.

FIG. 2 shows another embodiment of the display system in accordance with the invention. The display system shown in FIG. 2 is based on the display system shown in FIG. 1. The only differences are that the light guide is omitted and that the display device DD is a cathode ray tube instead of the flat display. The stack of the transparent front plate FP, the diffuser DI, and the transparent back plate BP is arranged in front of the display screen DS of the display device DD at a predetermined distance such that a volume V is present between the back plate BP and the display screen DS. The light sources LS are arranged such that the light emitted enters in the volume V. In this volume V, a light guide effect is obtained by the reflection of the light against the display screen glass. Preferably, the volume V is filled with air, but it is possible to use another transparent material. The volume V may be omitted if the light of the light sources LS can be directly coupled into the back plate BP. The stack of front plate FP, diffuser DI, and back plate BP can then be directly mounted on the surface of the display screen DS.

It should be noted that the above-mentioned embodiments illustrate rather than limit the invention, and that those skilled in the art will be able to design many alternative embodiments without departing from the scope of the appended claims.

Next, it should be noted that the invention enables a new generation of design possibilities, such as a television product that can be switched into a decorative lighting element, and the opposite: decorative light elements that can be positioned in living area's that can be switched into a display mode.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A display system comprising
a display device (DD) having a display screen (DS) for displaying an image,
a diffuser (DI) arranged in front of the display device (DD),
an illumination system (IS), and
a controller (CO) for controlling at least a portion the diffuser (DI) to be in a transparent state wherein a corresponding portion of the display screen (DS) is visible through the at least the portion of the diffuser (DI), or to be in an opaque state for hiding the corresponding portion of the display screen (DS), and for controlling the illumination system (IS) to illuminate at least the portion of the diffuser (DI) when in the opaque state.

2. A display system as claimed in claim 1, wherein the controller (CO) is constructed to switch the illumination system (IS) during the opaque state to a first light level, and to switch the illumination system (IS) to a second light level being lower than the first light level during the transparent state.

3. A display system as claimed in claim 1, wherein the display device (DD) has an off-state wherein no image is displayed, and an on-state wherein the image is displayed, and wherein the controller (CO) is constructed for obtaining the opaque state of the diffuser during the off-state and the transparent state during the on-state, and for controlling the illumination system (IS) to emit light having a higher brightness during the off-state than during the on-state.

4. A display system as claimed in claim 1, wherein the controller (CO) is constructed to switch on the illumination system (IS) during the opaque state and to switch off the illumination system (IS) during the transparent state.

5. A display system as claimed in claim 1, wherein the diffuser (DI) is divided in separate controllable portions, and wherein the controller (CO) is constructed for controlling the separate controllable portions to obtain a first sub-set of said portions which are in the opaque state and second sub-set of said portions which are in the transparent state.

6. A display system as claimed in claim 1, wherein the illumination system (IS) is constructed for illuminating a side of the diffuser (DI) being directed towards the display device (DD).

7. A display system as claimed in claim 1, wherein the illumination system (IS) comprises a light source (LS) along at least an edge of the illumination system.

8. A display system as claimed in claim 7, wherein the light source (LS) comprises at least one light emitting device.

9. A display system as claimed in claim 7, wherein the light source (LS) comprises at least one laser.

10. A display system as claimed in claim 1, wherein the illumination system (IS) comprises a light guide (LG) for guiding light emitted by the light source (LS) towards the diffuser (DI).

11. A display system as claimed in claim 10, wherein the light guide (LG) is coated with a reflective coating at least at a side directed towards the light source (LS), and wherein the reflective coating has at least one hole for enabling the light from the light source (LS) to enter the light guide (LG).

12. A display system as claimed in claim 10, wherein an area of the diffuser (DI) corresponds to an area of the display screen (DS), and wherein the light guide (LG) is constructed to illuminate substantially the total area of the diffuser (DI).

13. A display system as claimed in claim 1, wherein an area of the diffuser (DI) corresponds to an area of the display screen (DS).

14. A diffuser system comprising
a diffuser (DI) having at least one portion being controllable in a transparent state or an opaque state, and
an illumination system (IS) for illuminating the at least one portion of the diffuser (DI) when in the opaque state, wherein the illumination system (IS) comprises a light source (LS) being arranged along at least an edge of the diffuser (DI), and a light guide (LG) for guiding light emitted by the light source (LS) towards at least the at least one portion of the diffuser (DI).

15. A diffuser system as claimed in claim 14, further comprising a controller (CO) for controlling the at least one portion of the diffuser (DI) to be in the transparent state or in the opaque state, and for controlling the illumination system (IS) to illuminate at least the at least one portion of the diffuser (DI) when in the opaque state.

16. A method of controlling a diffuser (DI) and an illumination system (IS) in a display system comprising a display device (DD) having a display screen (DS) for displaying an image, the diffuser (DI) being arranged in front of the display device (DD), the illumination system (IS) being arranged for illuminating at least one portion of the diffuser (DI), the method comprising controlling (CO):
the at least one portion of the diffuser (DI) to be in a transparent state wherein the display screen (DS) is visible or in an opaque state for hiding the display screen (DS), and
the illumination system (IS) to illuminate at least the at least one portion of the diffuser (DI) when in the opaque state.

\* \* \* \* \*